United States Patent Office 3,177,254
Patented Apr. 6, 1965

3,177,254
AMINOHYDROXY AMINES
Edgar R. Rogier, Hopkins, and Richard W. Fulmer, Minneapolis, Minn., assignors to General Mills, Inc., a corporation of Delaware
No Drawing. Filed May 23, 1961, Ser. No. 111,931
18 Claims. (Cl. 260—570.5)

This invention relates to new and useful aminohydroxy amines and more particularly to (gamma aminopropyl)-substituted aminohydroxy amines.

The novel compounds of the present invention are represented by the formula:

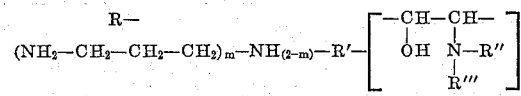

wherein R is hydrogen or a monovalent hydrocarbon radical having 1 to 21 carbon atoms, preferably 5 to 17 carbon atoms, R' is a divalent hydrocarbon radical of 1 to 21 carbon atoms, preferably 5 to 17 carbon atoms, the total number of carbon atoms in R and R' is in the range of 6 to 22 carbon atoms, preferably 10 to 16 carbon atoms, R" and R''' are selected from the group consisting of hydrogen, aliphatic, and aryl radicals, and $m$ is an integer of 1 to 2.

The above formula represents two groups of isomeric compounds which can be illustrated by the formulas:

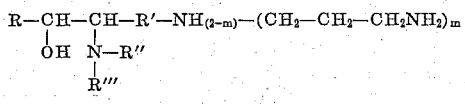

and

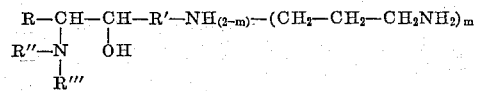

wherein R, R', R", R''', and $m$ are defined as above. Hereinafter, the description will be restricted to one isomeric form; however, it will be understood that the description applies equally to both isomers.

The compounds of the present invention can be prepared from any higher unsaturated fatty acid having 8 to 24 carbon atoms. Illustrated below is a typical preparation of a 9-(N,N-disubstituted)-amino-10-hydroxystearyl-(gamma-aminopropyl) amine from oleic acid:

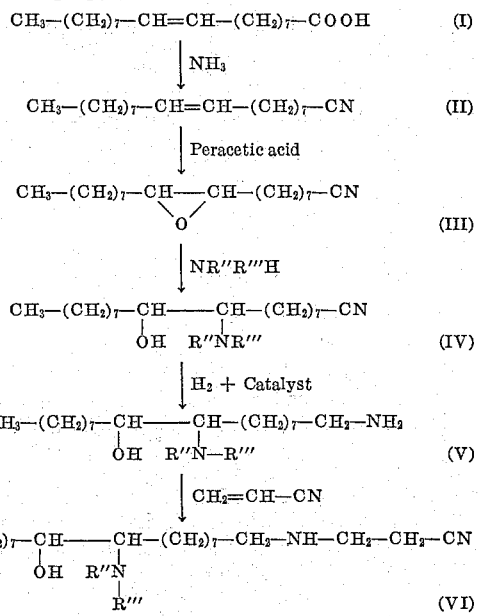

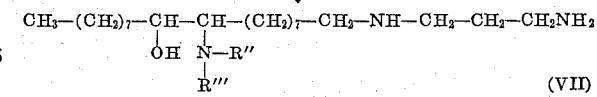

where R" and R''' are hydrogen, aliphatic, or aryl radicals.

The unsaturated fatty nitriles (II) can be prepared by reacting ammonia and a naturally occuring unsaturated higher fatty acid (I), such as oleic, erucic, eleostearic, linoleic, linolenic, clupanodonic, palmitoleic, and palmitolenic acids, forming thereby unsaturated fatty nitriles (II) having an even number of carbon atoms. Since higher fatty acids having an odd number of carbon atoms are rare, unsaturated fatty nitriles (II) having an odd number of carbon atoms are preferably prepared by the reaction of an unsaturated alkyl halide and an inorganic cyanide. The unsaturated higher fatty acids, supra, occur naturally in animal and vegetable fats and oils. The unsaturated alkyl halides can be prepared by converting an unsaturated fatty acid to an alcohol and subsequently reacting the alcohol with a halogen acid to form the unsaturated alkyl halide.

The unsaturated nitrile (II) is converted to the epoxy nitrile (III) by treatment with peracetic acid under typical epoxidation conditions. The epoxy nitriles (III) can be converted to the aminohydroxy nitrile (IV) by treatment with ammonia or any primary or secondary amino compound. If ammonia is used a primary aminohydroxy nitrile is formed, illustrated by the product IV wherein R" and R''' are hydrogen. If a primary amino compound is used to open the epoxide ring of the epoxy nitrile (III) the product is a secondary amine, as illustrated by product (IV) wherein R" is hydrogen and R''' is the radical derived from the primary amino compound reactant. Suitable primary amino compounds are the aliphatic primary amines such as methyl amine, ethyl amine, hexyl amine, octyl amine, stearyl amine, the aryl amines such as aniline and the amino phenols, the hydroxy alkyl amines containing from 1 to 4 carbon atoms, such as ethanolamine and the polyamines such as, ethylene diamine, diethylene triamine, triethylene-tetraamine, 1,2- and 1,3-propylenediamine and ortho-, meta-, para-xylylenediamine. Thus, it should be apparent that the primary amino compound used to split the epoxy compound is most uncritical and, in fact, any primary amino compound, as well as ammonia, may be employed therefor.

Similarly the reaction is general as to the secondary amines. Among the preferred secondary amines are included dimethyl amine, methylbutyl amine, ethylstearyl amine, dibutyl amine, diethanolamine, morpholine, piperazine and the like. The preparation of amino hydroxy nitriles is described in greater detail in the copending application of Edgar R. Rogier, S.N. 849,440, filed Oct. 29, 1959, now Patent No. 3,081,304.

The aminohydroxy amine (V) is prepared by the catalytic hyrogenation of the aminohydroxy nitrile (IV). Generally, any of the methods of the prior art used to hydrogenate nitrile to amines are suitable. A particularly satisfactory method utilizes Raney nickel and hydrogen at moderate temperatures (100 to 150° C.) and pressures (400 to 1500 p.s.i.g.). The preparation of aminohydroxy amines is described in the copending application of E. R. Rogier, S.N. 19,170, filed April 1, 1960.

The aminohydroxy amine (V) is cyanoethylated to form the cyanoethylated aminohydroxy amine (VI). In the illustration, the product is the (N,N-disubstituted)-aminohydroxy-(beta-cyanoethyl)-amine or more specifically 9 - (N,N - disubstituted) - amino - 10 - hydroxystearyl-(beta-cyanoethyl)amine. If more severe cyanoethylation conditions are employed, an additional mole of acrylonitrile can be added to the aminohydroxy amine to form a (N,N-disubstituted)-aminohydroxystearyl-di-(beta-cyanoethyl) amine:

$$CH_3-(CH_2)_7-\underset{\underset{R'''}{\overset{|}{N-R''}}}{\overset{\overset{OH}{|}}{CH}}-CH-(CH_2)_7-CH_2-N-(CH_2-CH_2-CN)_2$$

If the aminohydroxy amine is unsubstituted, that is, if in the preparation described above, the epoxy ring is cleaved with ammonia, then, four moles of acrylonitrile can be added to each mole of aminohydroxy amine. Illustrating with the amine prepared from oleic acid, the compound of the structure:

$$CH_3-(CH_2)_7-\underset{\overset{|}{OH}}{CH}-\underset{\overset{|}{N-(CH_2-CH_2-CN)_2}}{CH}-(CH_2)_7-CH_2-N-(CH_2-CH_2-CN)_2$$

is formed. Viewed from the prospective of composition, the compound is one in which R'' and R''' described above, are betacyanoethyl. Generally the cyanoethylation occurs in the order:

(1) Addition to the amine group attached to a primary carbon atom (—R'—NH$_2$, described above).

(2) Addition to the amine group attached to a secondary carbon atom $$-\underset{\overset{|}{OH}}{CH}-\underset{\overset{|}{NH_2}}{CH}-$$

described above.

(3) A second addition to the amine group attached to a primary carbon atom.

(4) A second addition to the amine group attached to a secondary carbon atom.

Steps 1 and 2 occur readily, and often both go to completion even under mild conditions. In addition the products formed by steps 3 and 4 will be present in small amounts as side products when such mild cyanoethylation conditions are employed. When more severe conditions are employed, the major product will be the tricyanoethylated and/or tetracyanoethylated product. The preferred reaction conditions to achieve each of the above results are illustrated in the examples.

Where the epoxide ring is opened by a primary amine in the preparation described above to form a (N-monosubstituted) aminohydroxy amine, then theoretically three moles of acrylonitrile can be added to such a product. Depending on the substituent on the nitrogen atom attached to the secondary carbon atom, the order of cyanoethylation is altered. In some cases the first two moles of acrylonitrile are added to the primary amine groups. In other cases, the second mole of acrylonitrile goes on the secondary amine. Under relatively severe cyanoethylation conditions, three moles of acrylonitrile can generally be added. In contrast to the ready dicyanoethylation which occurs with the unsubstituted aminohydroxy amines, when certain substituents are on the secondary amine group, only cyanoethylation at the primary amine group will occur under mild conditions. The anilino-hydroxyamines typically behave in this manner.

If the epoxide ring is split with a polyamine compound such as ethylene diamine, propylene diamine or, diethylene triamine, the additional amine groups introduced into the molecule can also be cyanoethylated.

The cyanoethylated aminohydroxy amine (VI) is hydrogenated to form the novel products of the present invention. In the illustration, the product is the (N,N-disubstituted) - aminohydroxy - (gamma-amino propyl)-amine or more specifically the 9-(N,N-disubstituted)-amino-10-hydroxystearyl (gamma-aminopropyl) - amine. Where the cyanoethylated aminohydroxy amine contains more than one cyanoethyl group, each group will be hydrogenated to the corresponding gamma-aminopropyl group.

When an acid having more than one double bond is employed as a starting material each double bond is epoxidized, the epoxy ring opened by ammonia or an amine, the nitrogen atoms cyanoethylated, and the cyanoethyl group hydrogenated, there is formed a product having a plurality of hydroxyl substituents and a plurality of substituted amino substituents. For example, when linoleic acid is treated by the above-mentioned preparatory procedure, there is formed a compound having the formula:

$$CH_3-(CH_2)_4-\underset{\underset{R'''}{\overset{|}{N-R''}}}{\overset{\overset{OH}{|}}{CH}}-\underset{\underset{R'''}{\overset{|}{NR''}}}{\overset{\overset{OH}{|}}{CH}}-CH_2-\underset{}{CH}-\underset{}{CH}-(CH_2)_7-CH_2NH-CH_2-\underset{\overset{|}{NH_2}}{CH_2}$$

where R'' and R''' are as previously described. In addition to this compound, there is formed three position isomers wherein the positions of the hydroxyl and amino substituents on adjacent carbon atoms, are reversed.

Another preferred starting acid is the mono-unsaturated hydrogenation product of linoleic acid. This product is a mixture of acids having unsaturation between the number 9 and 10 carbon atoms and acids having unsaturation between the number 12 and 13 carbon atoms. The 9–10 unsaturate is oleic acid which gives the 9(10)-(n,N-disubstituted)-amino-10(9)-hydroxystearyl (gamma-aminopropyl) amine by the above-illustrated route. The 12–13 unsaturate when treated by a similar procedure, gives the 12(13)-(N,N-disubstituted)-amino-13(12)-hydroxystearyl-(gamma-aminopropyl) amines which have the formula:

$$NH_2-CH_2-CH_2-CH_2-NH-CH_2-(CH_2)_{10}-\left[\begin{array}{c}-CH-CH-\\ \overset{|}{OH}\ \underset{\overset{|}{R'''}}{\overset{|}{NR''}}\end{array}\right]-CH_3-(CH_2)_4-$$

where R'' and R''' are as previously described.

Still another group of preferred products are those prepared from palmitoleic acid. These compounds have the formula:

$$NH_2-CH_2-CH_2-CH_2-NH-CH_2-(CH_2)_7-\left[\begin{array}{c}-CH-CH-\\ \overset{|}{OH}\ \underset{\overset{|}{R'''}}{\overset{|}{N-R''}}\end{array}\right]-CH_3-(CH_2)_5-$$

where R'' and R''' are as previously described.

Thus, the most preferred group of compounds are those represented by the formula:

$$NH_2-CH_2-CH_2-CH_2-NH-CH_2-(CH_2)_q-\left[\begin{array}{c}-CH-CH-\\ \overset{|}{OH}\ \underset{\overset{|}{R'''}}{\overset{|}{N-R''}}\end{array}\right]-CH_3-(CH_2)_p-$$

where R'' and R''' are as previously described and $p+q$ is 12 or 14.

As stated hereinbefore the preparation of the compounds of the present invention by the route illustrated above, will produce a mixture of two isomers since the epoxy ring may be split at either carbon to oxygen bond. In the reaction scheme shown above the isomers would be:

$$CH_3-(CH_2)_7-\underset{\underset{R'''}{\overset{|}{NR''}}}{\overset{\overset{OH}{|}}{CH}}-CH-(CH_2)_7-CH_2-NH-CH_2-CH_2-\underset{\overset{|}{NH_2}}{CH_2}$$

and $$CH_3-(CH_2)_7-\underset{\underset{R'''}{\overset{|}{NR''}}}{CH}-\underset{\overset{|}{OH}}{CH}-(CH_2)_7-CH_2-NH-CH_2-CH_2-CH_2-NH$$

where R'' and R''' are as previously described. These groups of compounds are the 9-(N,N-substituted)-amino-10-hydroxystearyl-(gamma-aminopropyl) amines and 10-(N,N-substituted) - amino - 9 - hydroxystearyl - (gamma-aminopropyl) amines, respectively. Isomers of this type are conveniently referred to by an alternative nomenclature, e.g., 9(10)-(N,N-disubstituted)-amino-10(9)-hydroxystearyl(gamma-aminopropyl) amines, which would include both isomers given above.

The isomeric products produced by the above-described preparative procedures can be readily separated by conventional methods. Generally however, the mixture of isomers is as useful as the individual isomeric forms. In such cases, the separative process can be avoided.

In order to further illutrate various aspects of the present invention, as well as the preferred embodiments thereof, the following examples are included. Unless otherwise indicated all parts and percentages used herein are by weight.

*Example I*

Into a stirred hydrogenation reactor were charged 100 parts of 9(10)-(beta-cyanoethyl)-amino-10(9)-hydroxystearyl-(beta-cyanoethyl) amine having a total amine number of 276, a secondary amine number of 245, a tertiary amine number of 27, and a hydroxyl number plus amine number of 365 as compared to theoretical values of 276, 276, 0, and 414, respectively, 3 parts methanol, 2 parts anhydrous ammonia, and 4.3 parts methanol-wet Raney nickel. The reactor was pressurized with hydrogen to a pressure of 850 p.s.i.g. While maintaining the hydrogen pressure, the reaction mixture was heated at a temperature of 135° C. for a period of 8 hours. The reaction mixture was then cooled, the catalyst removed by filtration and the solvent stripped from the product at reduced pressure. The resulting 9(10)-(gamma-aminopropyl) - amino - 10(9) - hydroxystearyl-(gamma-aminopropyl) amine had an acetylation value of 601 and an amine number of 479 as compared to theoretical values of 676 and 541 respectively. There is obtained 9(10)-(gamma - aminopropyl) - amino-10(9)-hydroxypalmityl-(gamma-aminopropyl) amine by substituting as a starting material, 9(10)-(beta-cyanoethyl)-amino-10(9)-hydroxy-palmityl-(beta-cyanoethyl) amine.

*Example II*

Into a 1 liter stirred autoclave was charged 11.5 grams of 9(10)-N-(beta-cyanoethyl)-N-dodecyl amino-10(9)-hydroxystearyl-(beta-cyanoethyl) amine having an amine number of 187, 140 grams absolute methanol, 10 grams methanol-wet Raney nickel, and 14 grams ammonia. The reaction mixture was agitated at 120–130° C. under 800–1000 p.s.i.g. hydrogen pressure for 3 hours. After removal of catalysts and solvents, there was recovered 10 grams of 9(10) - N - (gamma-aminopropyl)-N-dodecyl-amino - 10(9) - hydroxystearyl - (gamma - aminopropyl) amine. Analysis of the product showed that it had a total amine number of 378 and an acetylation number of 348 as compared to theoretical values of 412, for both determinations. There is obtained 9(10)-anilino-10(9)-hydroxystearyl-(gamma-aminopropyl) amine by substituting 9(10) - anilino-10(9)hydroxystearyl - (beta - cyanoethyl) amine for the starting material of this example.

*Example III*

Into a 1 liter autoclave was charged 12 grams of 9(10)-N - [beta-(beta-cyanoethyl)-aminoethyl]-N-[beta-cyanoethyl] - amino - 10(9)-hydroxystearyl-(beta-cyanoethyl) amine having an amine number of 337 prepared by the cyanoethylation of 9(10) - (beta-aminoethyl)-amino-10 (9)-hydroxystearyl amine, 140 grams absolute methanol, 10 grams Raney nickel catalyst, and 20 grams of ammonia. After agitating the mixture at 120–140° C. under 800–1000 p.s.i.g. hydrogen pressure for 3 hours, the reactor was cooled and the gas vented. The catalyst was removed by filtration and solvent evaporated under reduced pressure to yield 11 grams of 9(10)-N-[beta-(gamma - aminopropyl) - aminoethyl] - N - [gamma-aminopropyl] - amino - 10(9) - hydroxystearyl-(gamma-aminopropyl) amine having a total amine number of 598 and an acetylation number of 628 as compared to theoretical values for both determinations of 661. By substituting 9(10) - (beta - cyanoethyl)-ethanolamino-10(9)-hydroxystearyl-(beta-cyanoethyl) amine for the starting material of this example there is obtained 9(10)-gamma-amino- propyl) - ethanolamino - 10(9)-hydroxystearyl-(gamma-aminopropyl) amine.

*Example IV*

Into a 500 ml. stirred flask were charged 62 g. 9(10)-amino-10(9)-hydroxystearylamine having an amine number of 373, 16.6 g. distilled water, 24.9 g. methanol, 2.0 g. glacial acetic acid, 0.5 g. of 85% phosphoric acid. The solid amine melted as the mixture was heated to 40° C. Acrylonitrile was added dropwise over a period of ten minutes causing the temperature to rise to 58° C., the light yellow reaction mixture was then stirred at 70–74° C. for an additional 67 hours. The product was stripped of volatiles, dissolved in ether, washed with sodium carbonate and water, dried and the product recovered. The product contained approximately 38% of the tetracyanoethylated product, 9(10) - di - (beta-cyanoethyl)-amino-10(9)-hydroxystearyl-di-(beta-cyanoethyl) amine. Virtually all of the remaining material was the tricyanoethylated product, 9(10) - (beta - cyanoethyl)-amino-10(9)-hydroxystearyl-di-(beta-cyanoethyl) amine. The composite product had a total amine number of 234, an amine number of 158 after acetylation with acetic anhydride (a measure of tertiary amine groups) and a hydroxyl number of 187. The theoretical amine number for tricyanoethylated product was 245, and 218 for the tetracyanoethylated product.

Into a 1 liter stirred autoclave was charged 26 grams of polycyanoethylated 9(10)-amino-10(9)-hydroxystearylamine prepared as above, 200 grams absolute methanol, 15 grams Raney nickel, and 9 grams anhydrous ammonia. Hydrogenation was carried out at 120° C. and 1150 p.s.i.g. hydrogen pressure for a period of 4 hours. There was recovered a mixture of 9(10)-di-(gamma-aminopropyl) - amino - 10(9)-hydroxystearyl-di-(gamma-aminopropyl) amine and 9(10)-(gamma-aminopropyl)-amino - 10(9) - hydroxystearyl-di-(gamma-aminopropyl) amine having an amine number of 570 and an acetylation number of 508.

Substantially the same results are obtained by substituting for the starting materials of the examples any cyanoethylated aminohydroxyalkyl amine.

The foregoing examples are intended as illustrations of various embodiments of the invention and are not to be interpreted as limitations on the scope thereof.

The compounds of the present invention are useful as chemical intermediates, plasticizers for vinyl resins, additives for fuel oils, and corrosion inhibitors.

The embodiments of the invention in which an exclusive property or privilege is claimed are defined as follows:

1. The compounds of the formula:

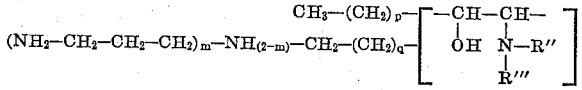

where R″ and R‴ are selected from the group consisting of alkyl groups of 1 to 18 carbon atoms, phenyl, monohydroxy substituted phenyl, monohydroxy substituted alkyl groups of 1 to 4 carbon atoms, monoamino substituted alkyl groups of 2 to 3 carbon atoms and monoamino substituted phenyl, $m$ is a whole integer of 1 to 2, $p$ is a whole integer selected from the group consisting of 4, 5 and 7, $q$ is a whole integer selected from the group consisting of 7 and 10 and $p+q$ is a whole, even integer of 12 to 14.

2. 9-(gamma-aminopropyl)-amino-10-hydroxystearyl - (gamma-aminopropyl) amine.

3. 10-(gamma-aminopropyl)-amino-9-hydroxystearyl - (gamma-aminopropyl) amine.

4. 9-(gamma-aminopropyl)-amino-10-hydroxystearyl - di-(gamma-aminopropyl) amine.

5. 10-(gamma-aminopropyl)-amino-9-hydroxystearyl - di-(gamma-aminopropyl) amine.

6. 9-(gamma-aminopropyl)-amino-10 - hydroxypalmi - tyl-(gamma-aminopropyl) amine.

7. 10-(gamma-aminopropyl)-amino-9-hydroxypalmityl-(gamma-aminopropyl) amine.
8. 9-(gamma-aminopropyl)-dodecylamino-10-hydroxystearyl-(gamma-aminopropyl) amine.
9. 10-(gamma-aminopropyl)-dodecylamino-9-hydroxystearyl-(gamma-aminopropyl) amine.
10. 9-(gamma-aminopropyl)-anilino-10-hydroxystearyl-di-(gamma-aminopropyl) amine.
11. 10-(gamma-aminopropyl)-anilino-9-hydroxystearyl-di-(gamma-aminopropyl) amine.
12. 9-beta-(gamma-aminopropyl)-aminoethyl-gamma-aminopropyl amino-10-hydroxystearyl-(gamma-aminopropyl amine.
13. 10-beta-(gamma-aminopropyl)-aminoethyl-gamma-aminopropyl amino-9-hydroxystearyl-(gamma-aminopropyl) amine.
14. 9-(gamma-aminopropyl)-ethanolamino-10-hydroxystearyl-(gamma-aminopropyl) amine.
15. 10-(gamma-aminopropyl)-ethanolamino-9-hydroxystearyl-(gamma-aminopropyl) amine.
16. 9-di-(gamma-aminopropyl)-amino-10-hydroxystearyl-di-(gamma-aminopropyl) amine.
17. 10-di-(gamma-aminopropyl)-amino-9-hydroxystearyl-di-(gamma-aminopropyl) amine.
18. (Gamma-aminopropyl)-aminohydroxystearyl-(gamma-aminopropyl) amine.

References Cited in the file of this patent
UNITED STATES PATENTS

| | | |
|---|---|---|
| 2,046,720 | Roger | July 7, 1936 |
| 2,929,845 | Harman et al. | Mar. 22, 1960 |